US008908705B2

(12) United States Patent
Zhang

(10) Patent No.: US 8,908,705 B2
(45) Date of Patent: Dec. 9, 2014

(54) ACCESS POINT AND METHOD FOR DATA TRANSMISSION

(75) Inventor: Weiwei Zhang, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 170 days.

(21) Appl. No.: 13/813,319

(22) PCT Filed: Aug. 1, 2011

(86) PCT No.: PCT/CN2011/077844
§ 371 (c)(1),
(2), (4) Date: Jan. 30, 2013

(87) PCT Pub. No.: WO2012/013163
PCT Pub. Date: Feb. 2, 2012

(65) Prior Publication Data
US 2013/0142033 A1 Jun. 6, 2013

(30) Foreign Application Priority Data

Jul. 30, 2010 (CN) .......................... 2010 1 0240905

(51) Int. Cl.
H04L 12/28 (2006.01)
H04W 24/02 (2009.01)
H04B 7/06 (2006.01)
H04L 1/00 (2006.01)
H04L 1/06 (2006.01)
H04L 1/18 (2006.01)

(52) U.S. Cl.
CPC ............. *H04W 24/02* (2013.01); *H04B 7/0691* (2013.01); *H04L 1/0002* (2013.01); *H04L 1/0019* (2013.01); *H04L 1/06* (2013.01); *H04L 1/1867* (2013.01); *Y02B 60/31* (2013.01)

USPC ........... 370/401; 370/252; 370/338; 370/334; 455/562.1

(58) Field of Classification Search
None
See application file for complete search history.

(56) References Cited

U.S. PATENT DOCUMENTS

2005/0249129 A1* 11/2005 Goodall et al. ................ 370/252
2008/0317014 A1* 12/2008 Veselinovic et al. .......... 370/380

(Continued)

FOREIGN PATENT DOCUMENTS

| CN | 1237053 | 12/1999 |
|---|---|---|
| CN | 1397142 | 2/2003 |
| CN | 1913718 | 2/2007 |

(Continued)

OTHER PUBLICATIONS

CN Office Action dated Jul. 4, 2012, CN Patent Application No. 201010240905.8 dated Jul. 30, 2010, The State Intellectual Property Office, the P.R. China.

(Continued)

*Primary Examiner* — Duc C Ho

(57) ABSTRACT

A method for data transmission disclosed is applied to an access point for use in a wireless local area network. The access point has multiple antennas. The method comprises in response to transmitting a first message successfully to a station, determining a maximum transmitting rate at which a message can be transmitted successfully using a current antenna group by increasing the transmitting rate and transmitting a message repeatedly; and, transmitting further messages to the station at the determined maximum transmitting rate.

15 Claims, 5 Drawing Sheets

(56) References Cited

U.S. PATENT DOCUMENTS

2009/0239523 A1* 9/2009 Miyamoto ................. 455/422.1
2011/0130099 A1* 6/2011 Madan et al. ................ 455/63.1
2013/0201932 A1* 8/2013 Ko et al. ....................... 370/329

FOREIGN PATENT DOCUMENTS

| CN | 101036320 | 9/2007 |
|---|---|---|
| CN | 101218834 | 7/2008 |
| CN | 101895325 | 11/2010 |
| WO | WO-2006/052058 | 5/2006 |

OTHER PUBLICATIONS

International Search Report and Written Opinion dated Nov. 3, 2011, PCT Patent Application No. PCT/CN2011/077844 filed Aug. 1, 2011, The State.

CN Second Office Action dated Jan. 24, 2013 issued on CN Patent Application No. 201010240905.8 filed on Jul. 30, 2010, The State Intellectual Property Office of the P.R. China.

* cited by examiner

US 8,908,705 B2

ACCESS POINT AND METHOD FOR DATA TRANSMISSION

CLAIM FOR PRIORITY

The present application is a national stage filing under 35 U.S.C. 371 of PCT application number PCT/CN2011/077844, having an international filing date of Aug. 1, 2011, which claims priority to Chinese Patent Application No. 201010240905.8, filed on Jul. 30, 2010, the disclosures of which are hereby incorporated by reference in their entireties.

BACKGROUND

In a wireless local area network (WLAN), an access point (AP) is a device which is able to communicate wirelessly with one or more stations. A station (STA) is any device that is able to wirelessly receive data from and/or wirelessly transmit data to an access point. In some, but not all, cases stations connected to the WLAN may be able to access the internet via the access point. WLAN may operate according to various protocols and the most common are defined by 802.11 family of standards. Recent developments in WLAN technologies include the introduction of Multiple Input Multiple Output (MIMO) techniques. That is, a radio frequency module for an access point may transmit multiple paths of signals simultaneously and may also simultaneously receive multiple paths of signals, and thus the utilization rate of channels can be raised by space multi-path technologies. Accordingly, one radio frequency module needs multiple antennas, and as for the character of the MIMO techniques, signal quality can be improved through multi-path phenomenon. One example of a WLAN standard that uses MIMO is 802.11n. 802.11n offers greatly increased physical rates, but has relatively restrictive requirements for the antennas' radiation angles and correlations between the antennas. In many conventional access points, one fixed antenna is provided for each signal transmitted or received, and rate selections of different modulation modes are performed to obtain an optimal result at software components.

In practical applications, throughput can be easily changed by rotating an Access Point (AP) or a Station (STA) by a certain angle. Therefore, some AP providers have begun to introduce smart antennas, such those that have been widely used in conventional mobile communications (e.g., 3G, LTE etc.), to a Wireless Local Access Network (WLAN) device, so as to improve WLAN user experiences.

DETAILED DESCRIPTION

Figure 1:
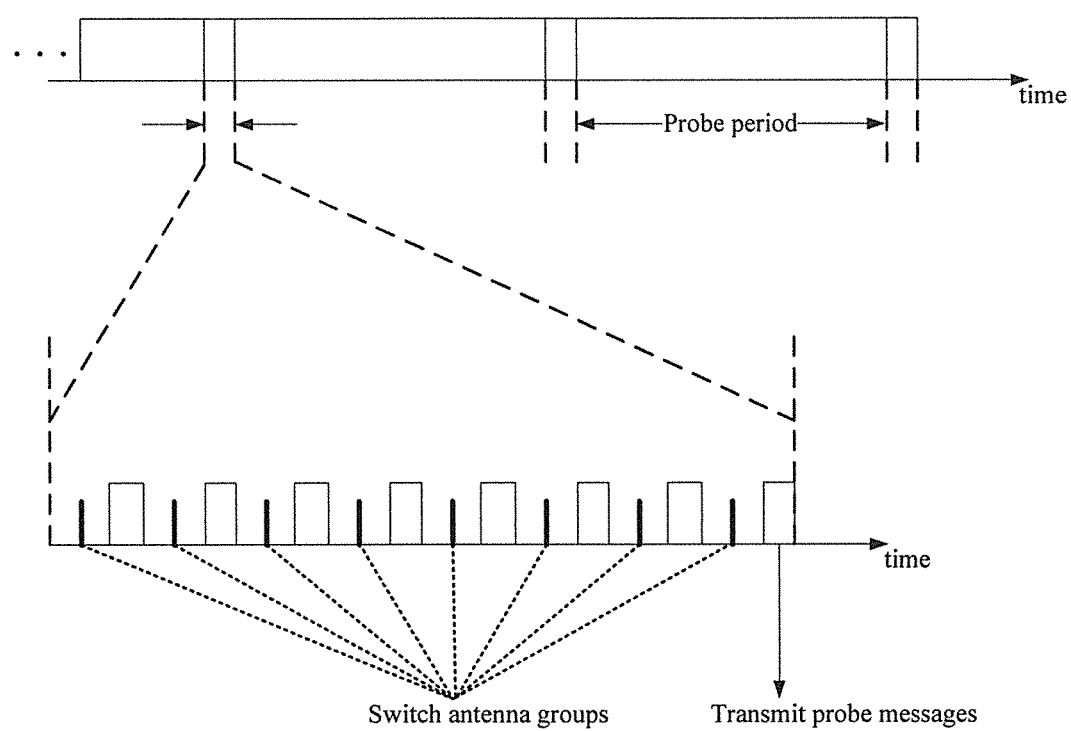
FIG. 1 is a diagram showing a method for selecting antennas according to an example of the present disclosure.

In one example, a method for selecting an antenna is provided, and the method includes: for each STA, all antenna groups are used respectively to transmit probe messages to collect working conditions of each antenna group within a certain period, so that an optimal antenna group may be selected, and then the optimal antenna group is used for transmission before the next probe period arrives. Specifically, as shown in FIG. 1, an AP uses a fixed antenna group to transmit signals within each probe period, and in the interval between each two probe periods, the AP uses all the antenna groups to transmit probe messages to obtain the optimal antenna group and uses the obtained optimal antenna group to transmit signals in the next probe period.

There are at least the following problems in the above example:

i. Poor Real Time Capability

When a wireless environment changes within the probe period, the wireless system fails to respond in real time, and the wireless system is able to update to the optimal antenna only when the next probe period arrives. Furthermore, the real time capability becomes increasingly poor as the probe period is increased.

ii. Low Accuracy

In an antenna scan process, the same rate is used for the sake of fairness. However, for the characters of the WLAN network, rate selection has great effect on the success rate of transmission, and thus the accuracy is relatively low, for instance, if the rate selected is high, it is possible that transmission performance is made poor when adopting each antenna group for transmitting data.

In another example, a data transmission mechanism combining antenna group selection and transmission rate adjustment is provided. Various examples are described in detail hereinafter with reference to the accompanying drawings.

Figure 2A:
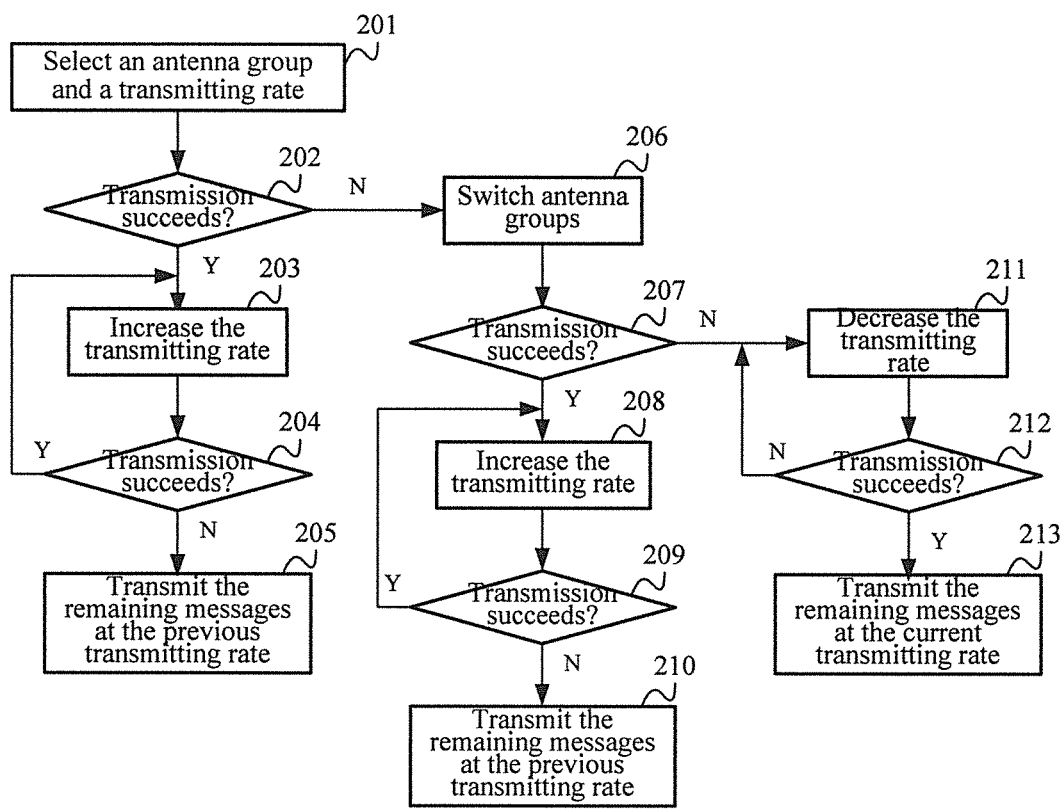
FIG. 2A is a diagram showing a procedure of data transmission according to an example of the present disclosure.

In a service processing procedure, when an access point (AP) needs to transmit data to a station (STA), the AP's data transmission procedure may be as shown in FIG. 2A, which generally includes the following blocks:

Block 201: the AP selects an antenna group and a transmitting rate.

Block 202: the AP transmits a first message to the STA adopting the selected antenna and the transmitting rate, and performs block 203 if the message is transmitted successfully, and otherwise, performs block 206.

Usually, in a WLAN application, after an AP transmits a message to a station (STA), the STA returns an acknowledgement message indicating a receipt condition, and the AP is able to judge whether the message has been successfully transmitted according to whether the acknowledgement message can be received or according to the content of the acknowledgement message.

Block 203: the AP increases the transmitting rate under the current antenna group condition, and then turns to block 204. Here, the so-called "under the current antenna group condition" is referred to as under a condition of adopting the current antenna group.

Block 204: the AP transmits a next message using the increased transmitting rate under the current antenna group condition, and turns to block 203 if the message is transmitted successfully, and otherwise, performs block 205.

Block 205: the remaining messages to be transmitted are transmitted to the STA adopting the rate used in the last successful transmission of the previous message, and the current procedure is terminated.

Block 206: the AP keeps the current transmitting rate unchanged and switches to another antenna group.

Block 207: the AP transmits a next message to the STA using the current antenna group and transmitting rate, and turns to block 208 if the message is transmitted successfully, and otherwise, performs block 211.

Blocks 208-210 are similar to blocks 203-205, where the AP increases the transmitting rate step by step in the situation of successful message transmission until a maximum rate for successfully transmitting messages under the current antenna group condition is obtained, then the remaining messages to be transmitted are transmitted using the maximum rate, and the current procedure is terminated.

Block 211: the AP decreases the current transmitting rate with the current antenna group being kept unchanged, and then turns to block 212.

Block 212: the AP transmits a next message using the decreased transmitting rate and the current antenna group, and turns to block 213 if the message is transmitted successfully, and otherwise, performs block 211.

Block 213: the AP will transmit to the STA the remaining messages to be transmitted using the current transmitting rate, and the current procedure is terminated.

In the above procedure, each time that the transmitting rate is increased, the increased value may be pre-determined by the system. In a similar way, each time that the transmitting rate is decreased, the decreased value may also be pre-determined by the system.

In block 207 of the above procedure, when the current message is transmitted unsuccessfully, it is possible to try to switch antenna groups many times, where, each time after switching to an antenna group, a message is transmitted using the current antenna group, and if it fails to transmit a message successfully after trying to switch antenna groups many times, block 211 is performed to decrease the transmitting rate. For reasons such as changes to the WLAN wireless environment or the like, the antenna group selected by the AP is not always able to satisfy requirements of transmission performance, and therefore, the antenna group satisfying the requirements of transmission performance may be found through an evaluation of multiple switch antenna groups.

In an example, when an AP starts up or needs to transmit data, the AP may first perform an initialization. The initialization may include initialization of a data structure, establishment of a database, and determination of antenna relationships as well as determination of transmission parameters used for a first-time message transmission, etc., in which, the database involved in the example may include: a database of transmission performance statistical data, which takes a transmitting parameter as its index, where, the transmitting parameter may include the antenna group, the transmitting rate and a number of retransmission times, the statistical data may include a loss rate, signal strength, etc. The determination of antenna relationships is referred to as determining the relationship of the antenna groups, that is, how many groups the antennas of the AP are divided into and the antennas included in each group. The transmission parameters used for the first-time message transmission may include: the antenna group and the transmitting rate, according to which the AP may perform transmission using the transmission parameters when transmitting the first message to the STA.

During data transmission of the AP, a transmission performance statistic may be performed according to a statistical period, and a statistical result may be recorded to a database with the transmitting parameter as the index, so that the AP is able to select the antenna group with the optimal transmission performance according to the transmission performance statistical data when the AP is switching the antenna groups. As a result, both the efficiency of antenna group selection and the system's throughput are increased. For example, in the blocks of FIG. 2A, the AP is able to search out the antenna group with the lowest loss rate from the database taking the transmitting parameter as the index when using the current transmitting rate, and then switch to the searched-out antenna group.

Figure 2B:
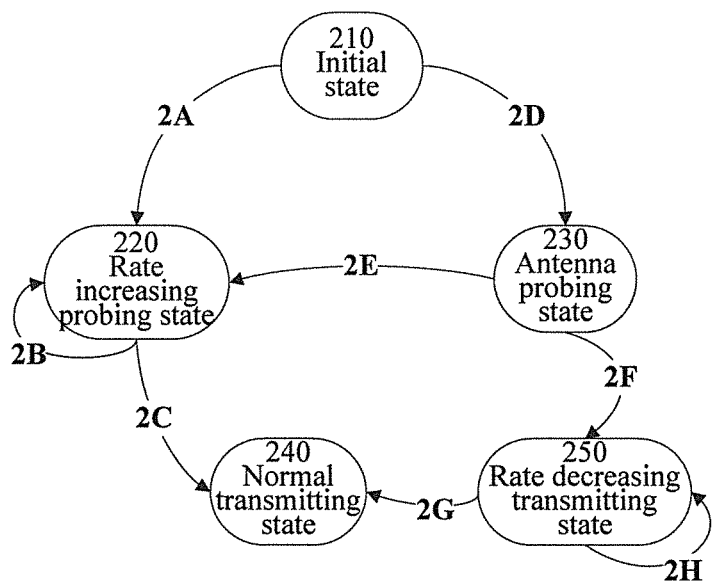
FIG. 2B is a diagram showing state transfer in the procedure shown in FIG. 2A.

The state transfer diagram of the procedure shown in FIG. 2A may be as shown in FIG. 2B. In FIG. 2B, at an initial state 210, the AP generally accomplishes some initialization operations, including the initialization of the data structure, the establishment of databases, the determination of the antenna relationships, the transmitting parameters used in the first-time message transmission, etc.

When transmission of a message is started to an STA, the AP enters a rate increasing probing state 220 (for instance, a path 2A). If the first message is transmitted successfully, at this state, the AP uses the current antenna group with a rate being increased by a level to transmit a next message; and, the AP continues to increase the transmitting rate (for instance, a path 2B). If rate increasing probing succeeds, and otherwise, the AP enters a normal transmitting state 240, at which the AP transmits to the STA the remaining messages using the rate used in the previous successful message transmission.

When the transmission of the first message is unsuccessful, the AP enters an antenna probing state 230 (for instance, a path 2D). At this state, the AP switches the antenna groups with the current rate being kept unchanged, and uses the antenna group to which the AP switches to transmit a next message. The AP enters the rate increasing probing state 220 (for instance, a path 2E) if this message is transmitted successfully after switching of the antenna groups. In addition, the AP enters a rate decreasing transmitting state 250 (for instance, a path 2F) if the AP fails to transmit a message successfully after switching the antenna groups for N times (N>=1), and at this state, the AP decreases the rate step by step and uses each decreased rate to transmit a message until a message is transmitted successfully, and then AP enters the normal transmitting state 240 (for instance, a path 2G) at which the AP uses the current rate to transmit the remaining messages to the STA.

It may be seen from the above description that on one hand, compared to the first example, antenna group probing is combined with rate probing to solve a problem that increasing of the transmitting rate brings on all of the antenna groups, so as to make the selection of the transmitting parameter more accurate; and on the other hand, the antenna group probing and the rating probing may be performed in real time, and the message practically needed to be transmitted is used, and therefore, compared to the first example, waiting for the probing period is unnecessary, and the AP is not required to transmit a probe message either, so that both the real time capability and selection efficiency are improved, and resources for the system and transmission are substantially reduced.

In another example, two timers are further defined in the WLAN system based on the above example. The two timers are a rate increasing probing timer and an antenna probing timer. The rate increasing probing timer may time the period in which the AP transmits messages under a certain rate. When the rate increasing probing timer expires, an indication that the AP has transmitted messages under a certain rate after rate increasing for a certain period of time is made, and at this time, the AP may increase the rate by a level until the AP reaches the maximum rate under which the AP may transmit a message successfully in the current antenna group condition, then the remaining messages may be transmitted using this maximum rate. The antenna probing timer may time the period in which the AP transmits messages using a certain antenna group, when the antenna probing timer expires, an indication that the AP has transmitted messages using a certain antenna group for a certain period of time is made, and at this time, the AP may switch to another antenna group to transmit messages. And thus, the AP may be adapted to changes in the WLAN wireless environment in a timely manner.

Figure 3:
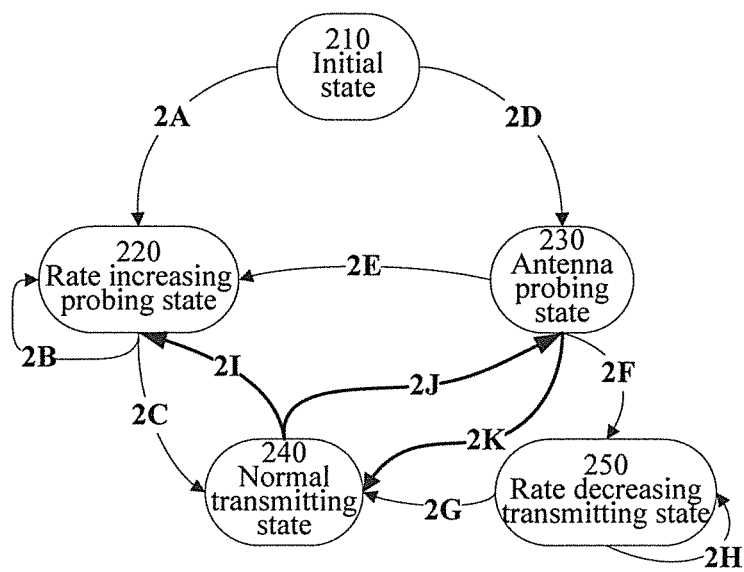
FIG. 3 is a diagram showing state transfer in a procedure of data transmission according to an example of the present disclosure.

FIG. 3 shows a state transfer diagram of an AP adopting the rate increasing probing timer and the antenna probing timer. The state transfer diagram shown in FIG. 3 is obtained by adding the following state transfer procedure to the state transfer procedure shown in FIG. 2B.

Upon the AP entering the normal transmitting state 240, the rate increasing probing timer is initiated. When the rate increasing probing timer expires, an indication that the AP has transmitted messages under the current rate for a determined period of time since the AP entered the normal transmitting state 240 is made. In addition, the AP turns to the rate increasing probing state 220 (for instance, a path 2I) at which the AP uses the current antenna group and the rate of a higher level to transmit a next message, herein, the so-called "the rate of a higher level" is referred to as the rate after being increased by one level. Following that increase, the state transfer procedure is similar to that shown in FIG. 2B, for instance, when a rate increasing probing succeeds, the AP continues to increase the transmitting rate (for instance, the path 2B), and otherwise, when a rate increasing probing fails, the AP enters the normal transmitting state 240 at which the AP uses the rate under which the previous message was successfully transmitted to transmit the remaining messages to the STA. Once the AP enters the normal transmitting state 240, the rate increasing probing timer is reset. Here, the so-called "a rate increasing probing succeeds" means a message is successfully transmitted under the rate that has been increased by one level and the current antenna group, and the so-called "a rate increasing probing fails" means a message is unsuccessfully transmitted under the rate that has been increased by one level and the current antenna group.

Upon the AP entering the normal transmitting state 240, the antenna probing timer begins timing. When the antenna probing timer expires, an indication that the AP has transmitted messages under the current antenna group for a determined period of time since the AP entered the normal transmitting state 240 is made. In addition, the AP turns to the antenna probing state 230 (for instance, a path 2J) at which the AP switches the antenna group and uses the antenna group to which the AP switches to transmit a message. When the message is successfully transmitted, the AP enters the rate increasing probing state 220 (for instance, the path 2E), and the processing and state transfer after that is similar to that shown in FIG. 2B. However, when the message transmission is unsuccessful, the AP switches back to the previous antenna group and enters the normal transmitting state 240 (for instance, a path 2K), following which, the state transfer procedure is similar to that shown in FIG. 2B and will not be discussed in detail.

It should be noted that the rate increasing probing timer and the antenna probing timer may be used individually or in combination, that is, it is possible to use only one of the two or to use both.

In the above examples, during transmission of a message (for instance, after each message is completely transmitted), the data item taking the transmitting parameters of the message as the index may be updated, that is, the message's transmission performance statistic, such as the loss rate, etc., may be updated, so as to reflect the current WLAN wireless network environment and to provide a basis for the subsequent selection of transmitting parameters. The AP may process the statistic corresponding to the transmitting parameters according to the usage condition of the transmitting parameters, and the specific processing method may include any one or any combination of the following:

1. When the AP switches to a certain transmitting parameter that has not been used for a long time (herein, a determination as to whether the certain transmitting parameter has not been used for a long time may be determined according to the system's configuration, for instance, a corresponding time-length threshold is to be used in determining whether a certain transmitting parameter has not been used for a long time). In addition, the AP may be updated after the statistical data, which includes taking the transmitting parameter as the index, is deleted in order to guarantee the time effectiveness of the statistical data.

2. When a certain transmitting parameter has been used with high frequency, its statistical data may be reduced proportionally to make the statistical data be more sensitive to changes to the transmitting parameter, so as to guarantee the real time capability of the changes to the transmitting parameter. Here, whether the transmitting parameter has been used with high frequency may be determined according to the times (which may be configured) that the transmitting parameter is used within a period of time, and alternatively, may be determined according to the length of time from a recorded time of when the transmitting parameter has been used last to the current time. For example, with regard to the widely-used loss rate's statistic, a loss-rate statistical data of 10/10 under the current transmitting parameter is produced, and by adding this data to the history data, a data of 1010/10010 is obtained, however the loss rate has not reached 10% yet, and fails to reflect the current changes to the wireless environment; and if the history data is reduced proportionally as 10/100, the loss rate will be 20/110, that is, 18.2%, after adding the current statistical data of 10/10 to the history data, so that the changing of the current wireless environment may be noticeably reflected and trigger the system to switch the transmitting parameter.

3. When the AP fails to select the optimal transmitting parameter to transmit messages according to the transmission performance statistical database following several iterations, the STA has likely changed its position or surroundings of the STA have likely been greatly changed. At this time, this database may be cleared (that is, the transmission performance statistical data corresponding to all of the transmitting parameters are deleted), and reinitialized, and the transmission performance statistic is re-performed in the message transmission procedure.

Figure 4:
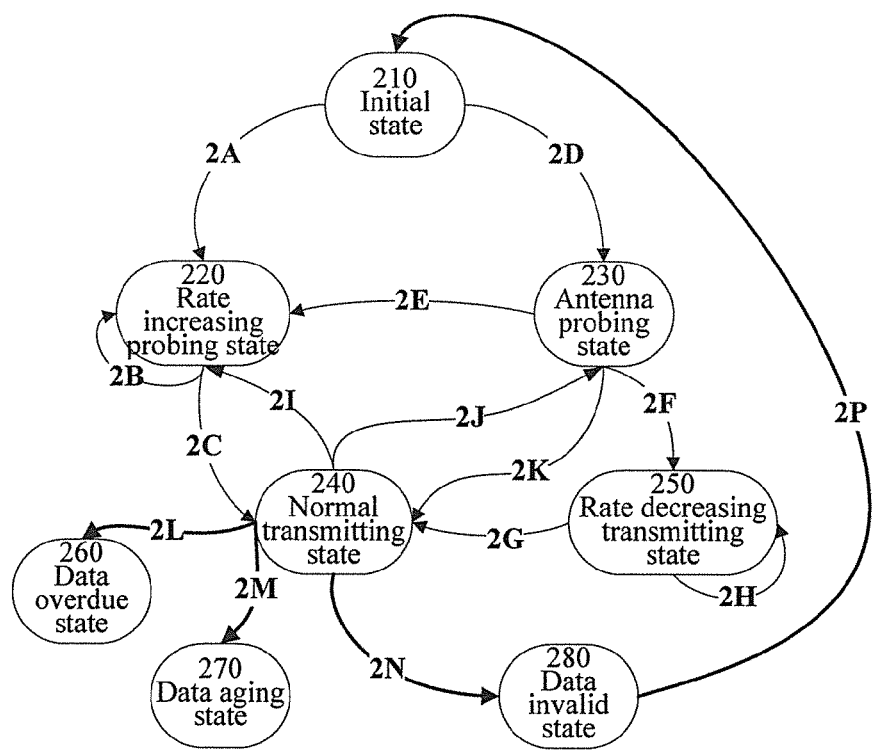
FIG. 4 is a diagram showing state transfer in a procedure of data transmission according to an example of the present disclosure.

FIG. 4 shows a state transfer diagram of updating a statistical database. As shown in FIG. 4, the following state transfer procedure is added to the state transfer diagram of FIG. 3.

When the AP switches to a certain transmitting parameter that has not been used for a long time, the AP enters a data overdue state 260 (for instance, a path 2L), and at this state, the statistical data corresponding to the transmitting parameter is deleted and the database is updated. When a certain transmitting parameter to which the AP switches has been used with high frequency, the AP enters a data aging state 270 (for instance, a path 2M) at which the corresponding statistical data are reduced proportionally to make the statistical data be more sensitive to the transmitting parameter's changing. When the AP fails to select the optimal transmitting parameter to transmit messages according to the statistical data recorded in the transmission performance statistical database continuously for several times (the number of the times can be configured), probably, the AP enters a data invalid state 208 (for instance, a path 2N) at which this database is cleared, and then the AP enters the initial state 210 (for instance, a path 2P) again. After that, the state transfer is in accordance with the aforementioned state transfer procedure and will not be discussed again.

In the each of the above examples, when switching the antenna groups, the AP may switch to an antenna group selected according to a pre-configured policy, for instance, randomly select an antenna group, or select an antenna group according to the number of the antenna groups. According to an example, a preferred antenna group may be selected according to the transmission statistical data using the transmitting parameter (the antenna group and the transmitting rate) recorded in the database as the index.

As is generally known, the greater the number of antennas provided for selection in an antenna array, the higher the optimal performance obtained by the WLAN. On the other hand, due to a larger number of the antennas, the probability of targeting the optimal antenna group will be decreased, that is, the time for finding the optimal antenna group will be lengthened. Therefore, an example provides a rapid convergence method of antenna switching to solve this problem which will be discussed in detail hereinafter.

Figure 5:
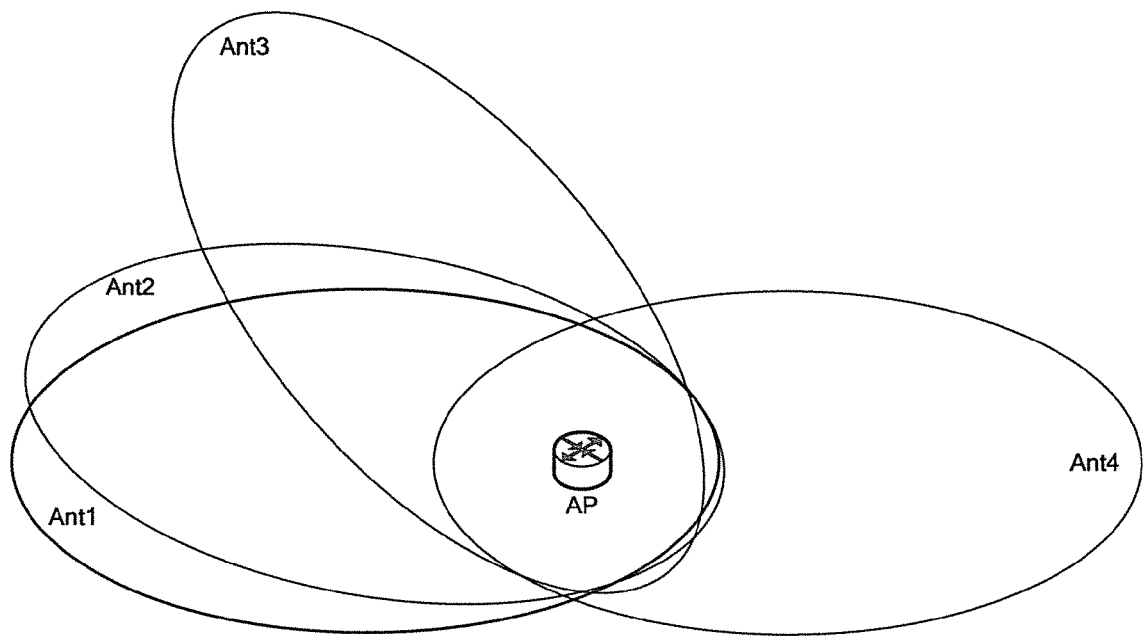
FIG. 5 is a diagram showing a radiation range of an antenna according to an example of the present disclosure; and, FIG. 6 is a diagram showing a data transmission apparatus according to an example of the present disclosure.

Firstly, all the antenna groups are divided into groups by the AP according to the antennas' radiation ranges, and the principle of dividing may include any one or any combination of the following:

Rule I. The antennas having similar radiation patterns belong to the same group. The antennas in the same group are called similar antennas, for instance, Ant 1 and Ant 2 as shown in FIG. 5, while the antennas in different groups are called different antennas, for instance, Ant 1 and Ant 3 as shown in FIG. 5. In addition, there are similar antenna groups and different antenna groups among the antenna groups.

Rule II. The radiation patterns of antennas in different antenna groups should be adjacent to each other for the sake of coverage in all directions, so that there is no null area inside the radiation patterns. Taking the antenna radiation pattern shown in FIG. 5 as an example, supposing Ant 1 and Ant 2 are in the same group while Ant 3 is in another group, there will appear a null area between the two groups. To avoid such situation, Ant 1 and Ant 2 are put in the same group, and Ant 2 and Ant 3 are put in the another group, that is, antennas between two adjacent groups may belong to both of the two adjacent antenna groups.

As an introduction to MIMO technologies, the relationship of the antenna group selection and the antenna transmission performance may have no complete correspondence relationship with their radiation pattern in theory. The similar antennas and different antennas of the AP may be adjusted through collecting the relationship of the practical antenna and transmission performance for each STA, so as to update the antenna groups.

When the AP needs to switch the antenna groups after division of the antennas, the AP may switch to the antenna group selected according to any one or any combination of the following rules:

Rule I. When the antenna groups require switching, the similar antenna groups (that is, the antenna groups having similar radiation ranges) may be used for switching if the condition of transmitting messages under the current antenna group is better (for instance, a transmission performance index exceeds a determined threshold). However, when the condition of transmitting messages under the current antenna group is worse (for instance, a transmission performance index is lower than a determined threshold), the different antenna groups (that is, the antenna groups having dissimilar radiation ranges) may be used for switching, so that efficiencies of antenna switching are raised and the antenna group selected is adapted to the current wireless environment. For example, with regard to the antenna radiation pattern shown in FIG. 5, the antennas are divided as: the first group including Ant 1 and Ant 2, the second group including Ant 2 and Ant 3, . . . , the nth group including Ant 4, where the antenna group currently used is the first antenna group, and when a need to switch the antenna groups arises, the AP switches to the second group of antennas, which have similar radiation ranges if the condition of transmitting messages under the current antenna group is better, and otherwise, the AP switches to the nth group of antennas which has different radiation ranges if the condition of transmitting messages under the current antenna group is worse.

Rule II. When an AP has not transmitted a message to an STA sending a message to the AP for a long time, and if the AP fails to successfully transmit a message to the STA after switching the antenna groups for several times, the AP may use an omni-directional antenna to transmit a message to the STA when trying to switch the antenna groups and transmit a message for the last time (that is, in the last-time retransmission according to the maximum number of retransmission times) in order to guarantee the message may be transmitted to the STA.

Rule III. When the AP is selecting the antenna group to which it switches, on one hand, the optimal antenna group may be selected according to the transmission performance statistical data corresponding to the transmitting parameters (the so-called optimal antenna group is the one having the best transmission performance); and on the other hand, the AP also needs to maintain comprehensiveness in the precondition of selecting the antenna group with high efficiency. And thus, in an example, selecting and probing is performed first according to Rule I during antenna probing, and then it is performed according to history records of the antenna probing (that is, the history records of the usage conditions of the antenna groups), for instance, select an unused antenna group, and the probing is re-performed with the precondition that most of the antenna groups have been probed.

Rule IV. When a new STA is added, the AP may select a preferred antenna group for the new STA according to the transmission performance statistical data of the STAs having been accessed (that is, the transmission performance statistical data using the transmitting parameter as the index), so as to raise the data's transmission performance and the system's throughput.

Rule V. When the optimal antenna group of a certain STA (which is called STA 1 herein for the convenience of description) changes (for instance, switches from the first antenna group to the second antenna group), and if it is also found that the optimal antenna group of another STA (which is called STA 2 herein for the convenience of description) the optimal antenna group of which is just the first antenna group is to be changed, the second antenna group may be selected when switching to a selected antenna group for STA 2. Furthermore, if the transmission performances of the two antenna groups after the switching have a large difference, they are recorded as opposite antenna groups (or different antenna groups) so as to provide reference for the subsequent selection of antenna groups. When the transmission performance decreases during the AP transmitting a message to a certain STA, the antenna group being a different antenna group of the current antenna will be selected during switching to an antenna group selected for the STA. And thus, the antenna group is selected according to changes in the wireless environment so as to raise the efficiency of the antenna group's selection and make the selected antenna group be adapted to changes in the current wireless environment to a certain extent.

Rule VI. When the AP transmits a broadcast message or a multicast message to an accessed STA, the AP may select an antenna group for the target STA from an intersection between the preferred antenna groups of all the STAB and those of the target STA to transmit the broadcast message or the multicast message, so as to guarantee that each STA may receive the broadcast message or the multicast message as far as possible and to ensure the data transmission performance to a certain extent.

In the above examples, when the AP is not busy (for instance, does not transmit any message in an antenna probing period), the AP may generate a message in a designated format for the antenna probing, recording and updating the transmission performance statistical data corresponding to the transmitting parameters, so that the AP may select a proper transmitting parameter according to the current wireless environment.

Considering the relative instability of the wireless environment, one message is usually permitted to be transmitted several times in order to guarantee that the message may be transmitted to the station, and the maximum times permitted may be called a hardware retransmission threshold.

Based on the above message retransmission mechanism, in another example, the number of hardware retransmission times may be divided into several levels based on the above examples in order to utilize advantages of the smart antenna, where each level uses different transmitting parameters (including the antenna group, the transmitting rate and the number of retransmission times) to raise the success rate of the transmission. In particular, the number of retransmission times of each level may be configured according to the following rules: the number of retransmission times of each level is in an inverse ratio to the merits of the historical statistical data corresponding to the transmitting parameters (for instance, the antenna group and the transmitting rate). For example, if the transmitting parameters of a certain level (including the antenna group and the transmitting rate) correspond to the historical statistical data indicating a better transmission performance under the transmitting parameters, the number of retransmission times of this level may be configured to be smaller, and otherwise, the number of retransmission times of a level may be configured to be larger if the transmitting parameters of this level correspond to the historical statistical data indicating a worse transmission performance under the transmitting parameters.

During the rate and/or antenna probing (for instance, during rate increasing/decreasing, and/or selecting an antenna group for switching), at first, the transmitting parameters of the first level (including: the antenna group, the transmitting rate and the number of retransmission times) are used in probing, where the number of times probing is attempted may be 1, and if the message is not successfully transmitted using the transmitting parameters of the first level, the transmitting parameters of the second level will be used for transmission, and so on, until the message is transmitted successfully or it reaches the configured number of hardware retransmission times. Wherein, at levels other than the first level, it is possible to select preferred transmitting parameters according to the database of the transmission performance and share the remaining number of hardware retransmission times.

Specifically, in the transmitting parameters of the adjacent two levels, the transmitting rate in the transmitting parameters of a latter level may be obtained by decreasing the transmitting rate in the transmitting parameters of the former level by a step; and/or, the radiation range of the antenna group in the transmitting parameters of the latter level is similar to or different from that of the antenna group in the transmitting parameters of the former level. Wherein, if the transmission performance under the transmitting parameters of the former level is better (for instance, the transmission performance index is higher than a configured threshold), an optimal antenna group is selected from the antenna groups similar to that in the transmitting parameters of this level (that is, the former level) as that in the transmitting parameters of the latter level according to the transmission performance statistical data corresponding to the transmitting rate of the former level. And otherwise, an optimal antenna group is selected from the antenna groups different from that in the transmitting parameters of the former level as that in the transmitting parameters of the latter level according to the transmission performance statistical data corresponding to the transmitting rate of the former level.

For example, when the transmitting parameters are divided into four levels and the maximum number of retransmission times is ten, the transmitting parameters of the first level is (ant0, rate0, n0), where, an 0 indicates the current antenna group, rate0 indicates the current transmitting rate (at the normal transmitting state, ant0 and rate0 are the optimal transmitting parameters being probed), n0 indicates the permitted number of retransmission times under ant0 and rate0, and preferably, n0=1. The transmitting parameters of the second level (ant1, rate0, n1), where, ant1 may be determined according to ant1 and Rule I used in antenna group selection, n1 indicates the permitted number of retransmission times under ant1 and rate0. The transmitting parameters of the third level (ant2, rate1, n2), where, rate 1 is the transmitting rate one-level lower that rate0, ant2 is the optimal antenna group selected from the database according to rate1, n2 indicates the permitted number of retransmission times under ant2 and rate1. Similarly, the transmitting parameters of the fourth level (ant3, rate2, n3), where, rate2 is the transmitting rate one-level lower that rate1, ant3 is the optimal antenna group selected from the database according to rate2, n3 indicates the permitted number of retransmission times under ant3 and rate2. Wherein, n0+n1+n2+n3=10, that is, the sum of n0 to n3 is equal to the number of hardware retransmission times configured in the system, and the values of n1, n2 and n3 may in a inverse ratio to the transmission performance corresponding to the antenna groups and transmitting rates of their respective levels, for instance, if the transmission performance of each level decreases in turn, and then, n1=2, n2=3, n4=4, and n0=1, thus the maximum number of retransmission times is ten.

When the AP transmits a message, the AP first uses the transmitting parameters of the first level, and then uses the transmitting parameters of the second level if the transmission fails, and so on, until the message is successfully transmitted or the AP reaches the number of hardware retransmission times (that is, the maximum number of retransmission times).

It should be noted that the number of retransmission times in the transmitting parameters of the first level are set to one if the transmitted message is a probing message (that is, the message transmitted at the rate increasing probing state or the antenna probing state).

The above is just a method for dividing the transmitting parameters into multiple levels, according to an example in which those skilled in the art may divide the transmitting parameters into multiple levels according the system's demands.

The above descriptions are all regarding to the situations in which the AP transmits a message to the STA, when the AP receives a message, the AP may process correspondingly according to the system's type, for instance, the processing may include:

With regard to the system using Point Coordination Function (PCF), the AP may select the antenna with the best transmission performance for the STA to receive data from the STA, that is, select the antenna group with the best transmission performance when transmitting data to the STA to receive the data from the STA. With regard to the system using Distributed Coordination Function (DCF), the AP cannot confirm which STA will get the channel because the 802.11 protocol prescribes a fair competition principle using CSMA/CA, and thus the AP is unable to correctly switch to the corresponding antenna group to receive the data. Regarding this situation, the antenna group with the best omni-directionality is used to receive the data from the STA. And further, the AP may perform corresponding processing when any of the following conditions is satisfied:

1. In a DCF system, when there is only one STA being accessed, the AP may select an antenna group like an omni-directional one from the preferred antenna groups for the STA according to the recorded transmission performance statistical data to receive the data from the STA, so as to raise the data transmission performance.

2. In a DCF system, when there are more than one STA being accessed, the AP may attempt to find an antenna group like an omni-directional one in the transmission performance statistical database and if this found antenna group has better transmission performance compared with all the STAs being accessed, the AP uses this antenna group to receive the data from these STA, so as to decrease implementation complexity and guarantee the data transmission performance at the same time as far as possible.

It should be noted that the AP is regarded as a transmitting end of the data in the description of the above examples. In fact, other types of wireless devices in the WLAN may also adopt the method provided by the examples to perform data transmission.

Based on the above technical solutions, an example provides a data transmission apparatus applicable to the above procedures.

Figure 6:
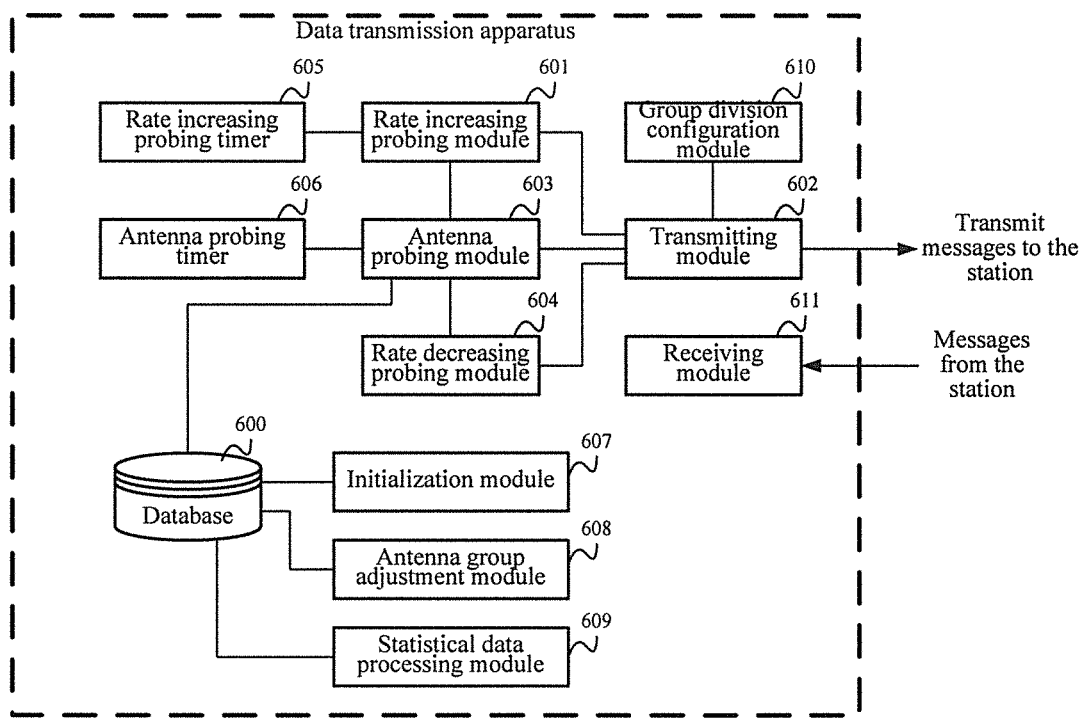

As shown in FIG. 6, the data transmission apparatus provided by the example may be applied to a WLAN implementing multiple antennas, and may include:

A database 600 to store data, which may include antenna information, such as antenna relationships, division of the antenna groups, etc., and may also include transmission performance statistical data obtained in the data transmission procedure. The transmission performance statistical data may use transmitting parameters (such as the antenna group, the transmitting rate and the number of retransmission times) as the index;

A rate increasing probing module 601 to keep the current antenna group unchanged when the first message is transmitted to an station successfully in a service procedure with the station, to raise the transmitting rate to transmit a next message, and so on, until it reaches the maximum rate under which the message may be successfully transmitted using the current antenna group; and, A transmitting module 602, adapted to transmit messages, and adopt the maximum rate to transmit the remaining messages in this server procedure after the rate increasing probing module 601 obtains the maximum rate.

The above apparatus may further include: an antenna probing module 603 and a rate decreasing probing module 604, wherein:

The antenna probing module 603 is to keep the current transmitting rate unchanged and to switch to another antenna group to transmit a next message after the transmitting module 602 fails to transmit the first message to the station.

The rate increasing probing module 601, after the antenna probing module 603 transmits a message successfully after switching to an antenna group, may keep the current antenna group unchanged and may increase the transmitting rate to transmit a next message, and so on, until it reaches the maximum transmitting rate under which the message may be successfully transmitted using the current antenna group.

The rate decreasing probing module 604 is to, after the antenna probing module 603 transmits a message unsuccessfully after switching to an antenna group, keep the current antenna group unchanged and to decrease the transmitting rate to transmit a next message, and so on, and stop decreasing the transmitting rate until it successfully transmits a message.

The transmitting module 602 may further transmit the remaining message in this service procedure to the station under the rate determined by the rate decreasing probing module 604 under which the message may be successfully transmitted.

The above apparatus may further include: a rate increasing probing timer 605 to time the period in which the message is transmitted under the current transmitting rate. And accordingly, when the rate increasing probing timer 605 expires, the rate increasing probing module 601 may further keep the current antenna group unchanged, increase the transmitting rate to transmit a next message, and so on, until it reaches the maximum rate under which the message can be transmitted successfully using the current antenna group. The transmitting module 602 may use the maximum rate obtained by the rate increasing probing module 601 to transmit the remaining messages to the station.

The above apparatus may further include an antenna probing timer 606, adapted to time the period in which the message is transmitted using the current antenna group. And accordingly, when the antenna probing timer 606 expires, the antenna probing module 603 may keep the current transmitting rate unchanged and may switch to another antenna group to transmit a next message. If the antenna probing module 603 transmits a message successfully after switching to another antenna group, the rate increasing probing module 601 keeps the current antenna group unchanged, increases the transmitting rate to transmit a next message, and so on, until it reaches the maximum rate under which the message may be successfully transmitted using the current antenna group. If the antenna probing module 603 transmits a message unsuccessfully after switching to another antenna group, the rate decreasing probing module 604 keeps the current antenna group unchanged, and decreases the transmitting rate to transmit a next message, and so on. The rate decreasing probing module 604 stops decreasing the transmitting rate until the message may be successfully transmitted. The transmitting module 601 may use the maximum rate obtained by the rate increasing probing module 601 to transmit the remaining messages to the station, or using the rate under which the message may be successfully transmitted obtained by the rate decreasing probing module 604 to transmit the remaining messages to the station.

The antenna probing module 603 in the above apparatus may select the antenna group for the station according to at least one of the following rules:

1. If the data transmission performance index under the current antenna group is higher than a determined threshold, the antenna group similar to the current antenna group is selected for switching; and otherwise, if the data transmission performance index under the current antenna group is lower than the determined threshold, an antenna group different from the current antenna group is selected for switching.

2. When a message is required to be transmitted to a station to which it has not transmitted a message within a determined period of time, an omni-directional antenna will be selected in the last-time retransmission according to the maximum number of retransmission times if the AP fails to transmit a message to the station after switching the antenna groups several times.

3. When the antenna group used to transmit a message to the station is similar to that used to transmit a message to another station and the apparatus switches from the antenna group to another antenna group for the another station, the another antenna group is selected for the station for switching.

4. When transmitting a broadcast message or a multicast message to the station, the antenna group is selected from the intersection of the antenna groups for all the stations.

5. When the transmission performance of the station decreases, an antenna group different from the current antenna group is selected.

6. When the station has just joined in the network, an antenna group for transmitting the first message is selected for this newly accessed station according to the transmission performance statistical data of the stations that are currently being accessed.

The antenna probing module 603 in the apparatus may further be operated to:

When the data transmission performance index under the current antenna group is higher than the determined threshold, the antenna group is selected according to the historical records of the usage of the antenna groups if the AP fails to switch to a selected antenna group that is similar to the current antenna group; and/or, When the data transmission performance index under the current antenna group is lower than the determined threshold, the antenna group is selected according to the historical records of the usage of the antenna groups if the AP fails to switch to a selected antenna group that is different from the current antenna group.

The above apparatus may further include:

An initialization module 607 to determine similar antennas and different antennas according to the similarity of the antenna radiation patterns in initialization, and to divide the antennas into the antenna groups according to the similar antennas and the different antennas, where, the antennas in the same group are similar antennas while those in different groups are different antennas; and, An antenna group adjusting module 608 to, in the initialization, adjust the similar antennas and the different antennas according to the collected antenna information, and adjust the antenna groups according to the adjusted similar antennas and different antennas.

The above apparatus may further include a statistical data processing module 609 to:

When an antenna group and/or a transmitting rate switched to has not been used for a determined period of time, the transmission performance statistical data corresponding to the antenna group and/or the transmitting rate are deleted; and/or, When the usage times of an antenna group and/or a transmitting rate that has been switched to within a determined period of time reach a determined threshold or an antenna group and/or a transmitting rate that has been switched to has been used within a latest determined period of time, the transmission performance data corresponding to the antenna group and/or the transmitting rate are reduced proportionally; and/or, When the AP fails to transmit a message after continuously switching antenna groups and/or transmitting rates and the continuous switching times reach a determined threshold, the transmission performance statistical data corresponding to all the antenna groups and/or all the transmitting rates are cleared.

The above apparatus may further include:

A group division configuration module 610 to configure multiple groups of transmitting parameters and a group order of the transmitting parameters, each group of transmitting parameters including an antenna group, a transmitting rate and a number of retransmission times under the antenna group and the transmitting rate, where, the sum of the numbers of retransmission times in all the groups' transmitting parameters is the maximum number of retransmission times of the message, and for each group, the number of retransmission times in a group's transmitting parameters is in a inverse ratio to the transmission performance corresponding to the antenna group and transmitting rate in the group.

And accordingly, the transmitting module 602 may use corresponding transmitting parameters to transmit a message according to the group order of the transmitting parameters when transmitting messages, and may select another group of transmitting parameters when the AP fails to transmit a message using the current transmit parameters, and so on, until the AP successfully transmits the message or reaches the maximum number of retransmission times.

The above apparatus may further include: a receiving module 611 to select an antenna group with the best transmission performance when transmitting a message to the station to receive a message from the station in a PCF system; or, in a DCF system, select an omni-directional antenna group to receive the message from the station. Furthermore, in the DCF system when the station is the only one accessed to the network, the receiving module 611 may select an antenna group like the omni-directional one from the antenna groups with the best transmission performance when transmitting a message to the station to receive the message from the station. And alternatively, when the station is not the only one accessed to the network, an antenna, under which the transmission performance index may reach a determined value for all the currently access stations, is selected from the antenna groups like the omni-directional one, and the selected antenna group is used to receive the message from the station.

The specific functions implemented by each functional module in the above data transmission apparatus may be referred to the corresponding description in the aforementioned procedure, and will not be discussed again herein.

To sum up, for the WLAN, the data transmission mechanism combining the antenna group with the transmitting rate provided in the above examples may increase antenna gains, improve signal strength, enlarge system capacity and coverage, etc., and may also rapidly respond to changes in the wireless environment, decrease effects of interference, and realize rapid convergence to find the best transmitting parameters more quickly.

Based on the above-description of the examples, those skilled in the art would clearly understand that the examples may be implemented by machine-readable instructions plus a necessary common hardware platform, of course, they may also be implemented by hardware. Based on such understanding, the technical solutions of the examples substantially or in individual parts may be presented in a form of machine-readable instructions which is stored in a non-transitory computer readable storage medium including several instructions to make a computing device (may be a personal computer, a server, a network device, etc.,) execute the method of the examples.

Those skilled in the art may understand that the modules in the apparatus of the examples disclosed herein may be distributed in the apparatus of the example according to the descriptions of the examples, and may also be varied to be located in one or more apparatuses different from those of the examples. The modules of the above examples may be integrated into one module or may be further divided into multiple sub-modules.

The invention claimed is:

1. A method for data transmission by an access point in a wireless local area network, the access point having multiple antennas, the method comprising:
   in response to the access point successfully transmitting a first message to a station, the access point determining a maximum transmitting rate at which a message be transmitted successfully using a current antenna group by increasing the transmitting rate and transmitting a message repeatedly; and,
   the access point transmitting further messages to the station at the determined maximum transmitting rate.

2. The method according to claim 1, further comprising:
   in response to an unsuccessful transmission of the first message, the access point switching to another antenna group to transmit a next message;
   in response to said next message being transmitted successfully, determining the maximum transmitting rate at which a message can be transmitted successfully using the current antenna group by increasing the transmitting rate and transmitting a message repeatedly;
   in response to an unsuccessful transmission of said next message, determining the maximum transmitting rate at which a message can be transmitted successfully using the current antenna group by decreasing the transmitting rate and transmitting a message repeatedly; and,
   transmitting further messages to the station at the currently determined maximum transmitting rate.

3. The method according to claim 2, further comprising:
   in response to having transmitted messages at the current transmitting rate for a predetermined period of time, determining the maximum transmitting rate at which a message is able to be transmitted successfully using the current antenna group by increasing the transmitting rate and transmitting a message repeatedly, and transmitting further messages to the station at the currently determined maximum transmitting rate.

4. The method according to claim 2, further comprising:
   in response to having transmitted messages using the current antenna group for a predetermined period of time, switching to another antenna group to transmit a next message;
   in response to said next message being transmitted successfully, determining the maximum transmitting rate at which a message be transmitted successfully using the current antenna group by increasing the transmitting rate and transmitting a message repeatedly;
   in response to an unsuccessful transmission of said next message, determining the maximum transmitting rate at which a message be transmitted successfully using the current antenna group by decreasing the transmitting rate and transmitting a message repeatedly; and,
   transmitting further messages to the station at the currently determined maximum transmitting rate.

5. The method according to claim 2, further comprising:
   during initialization, determining similar antennas and different antennas according to similarities of radiation patterns of the antennas, and dividing antenna groups according the similar antennas and the different antennas, wherein, antennas in the same antenna group are the similar antennas and antennas in the different antenna groups are the different antennas; and,
   after the initialization, adjusting the similar antennas and the different antennas according to collected antenna information, and adjusting division of the antenna groups according to the adjusted similar antennas and different antennas.

6. The method according to claim 2, further comprising:
   in response to a determination that an antenna group and/or a transmitting rate that has been switched to having not been used for a determined period of time, deleting transmission performance statistical data corresponding to said antenna group and/or said transmitting rate; and/or,
   in response to a determination that an antenna group and/or a transmitting rate that has been switched to having been used for a determined number of times within a determined period of time or having been used within a latest period of time, reducing transmission performance statistical data corresponding to said antenna group and/or said transmitting rate proportionally; and/or,
   in response to a failure in transmitting a message after continuing of the switching to an antenna group and/or a transmitting rate for a determined number of times, clearing transmission performance statistical data corresponding to all the antenna groups and/or the transmitting rates.

7. The method according to claim 2, further comprising:
   when applied in a Point Coordination Function (PCF) system, selecting an antenna group which is of good transmission performance when transmitting messages to the station to receive messages from the station; or,
   when applied in a Distributed Coordination Function (DCF) system, selecting an omni-directional antenna group to receive the messages from the station.

8. An access point for use in a wireless local area network, the access point comprising:
   multiple antennas;
   a rate increasing probing module to, when a transmitting module transmits a first message successfully to a station, determine a maximum transmitting rate at which a message be transmitted successfully using a current antenna group by increasing the transmitting rate and enabling the transmitting module to transmit a message repeatedly; and,
   the transmitting module, to transmit messages, and to transmit further messages to the station at the maximum transmitting rate determined by the rate increasing probing module after the maximum transmitting rate is determined.

9. The access point according to claim 8, further comprising: an antenna probing module and a rate decreasing probing module, wherein:

the antenna probing module is to switch to another antenna group for transmitting a next message when the transmitting module fails to transmit the first message;

the rate increasing probing module is further to determine the maximum transmitting rate at which a message can be transmitted successfully using the current antenna group by increasing the transmitting rate and enabling the transmitting module to transmit a message repeatedly after the antenna probing module switches to said another antenna group and the transmitting module transmits said next message successfully;

the rate decreasing probing module is to determine the maximum transmitting rate at which a message can be transmitted successfully using the current antenna group by decreasing the transmitting rate and enabling the transmitting module to transmit a message repeatedly after the antenna probing module switches to said another antenna group and the transmitting module fails to transmit said next message; and, the transmitting module is further to transmit further messages to the station at the maximum transmitting rate determined by the rate decreasing probing module after the maximum transmitting rate is determined.

10. The access point according to claim 9, further comprising: a rate increasing probing timer; wherein:

the rate increasing probing timer is to time a process of transmitting messages at the current transmitting rate; and, the rate increasing probing module is further to determine the maximum transmitting rate at which a message can be transmitted successfully using the current antenna group by increasing the transmitting rate and enabling the transmitting module to transmit a message repeatedly when the rate increasing probing timer expires.

11. The access point according to claim 9, further comprising: an antenna probing timer; wherein:

the antenna probing timer is to time a process of transmitting messages using the current antenna group; and, the antenna probing module is further to switch to another antenna group to transmit said next message when the antenna probing timer expires.

12. The access point according to claim 9, further comprising:

an initialization module to, during initialization, determine similar antennas and different antennas according to similarities of radiation patterns of the antennas, and to divide antenna groups according to the similar antennas and the different antennas, wherein, antennas in the same antenna group are the similar antennas, antennas in different antenna groups are the different antennas; and, an antenna group adjusting module to, after the initialization, adjust the similar antennas and the different antennas according to collected antenna information, and adjust division of the antenna groups according to the adjusted similar antennas and the different antennas.

13. The access point according to claim 9, further comprising:

a statistical data processing module to:

when an antenna group and/or a transmitting rate switched to has not been used for a determined period of time, delete transmission performance statistical data corresponding to said antenna group and/or said transmitting rate; and/or, when an antenna group and/or a transmitting rate switched to has been used for a determined number of times within a determined period of time or has been used within a latest period of time, reduce transmission performance statistical data corresponding to said antenna group and/or said transmitting rate proportionally; and/or, when transmission of a message is unsuccessful after continuing switching to an antenna group and/or a transmitting rate for a determined number of times, to clear transmission performance statistical data corresponding to all the antenna groups and/or the transmitting rates.

14. The access point according to claim 9, further comprising a receiving module to:

when applied in a Point Coordination Function (PCF) system, select an antenna group which is of good transmission performance when transmitting messages to the station to receive messages from the station; or, when applied in a Distributed Coordination Function (DCF) system, select an omni-directional antenna group to receive messages from the station.

15. The access point according to claim 14, wherein, the receiving module is further to, when the station is the only one accessed to the network, select an omni-directional antenna group from the antenna groups which are of good transmission performance when transmitting messages to the station to receive the messages from the station, and otherwise, select an omni-directional antenna group from the antenna groups which are to reach a determined transmission performance index for all the currently accessed stations to the network to receive the messages from the station.

\* \* \* \* \*